United States Patent
Waldhauser et al.

(10) Patent No.: US 9,049,744 B2
(45) Date of Patent: Jun. 2, 2015

(54) RELAYING COMMUNICATIONS IN ADVANCED LTE SYSTEMS

(75) Inventors: Richard Waldhauser, Munich (DE); Angelo Centonza, Winchester (GB); Wei Hua Zhou, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/806,383

(22) PCT Filed: May 31, 2011

(86) PCT No.: PCT/EP2011/058943
§ 371 (c)(1),
(2), (4) Date: Apr. 23, 2013

(87) PCT Pub. No.: WO2011/160924
PCT Pub. Date: Dec. 29, 2011

(65) Prior Publication Data
US 2013/0208649 A1    Aug. 15, 2013

(30) Foreign Application Priority Data
Jun. 22, 2010   (GB) .................... 1010410.7

(51) Int. Cl.
H04W 88/04 (2009.01)
H04W 40/36 (2009.01)
H04W 36/00 (2009.01)
H04W 92/20 (2009.01)

(52) U.S. Cl.
CPC .......... *H04W 88/04* (2013.01); *H04W 36/0055* (2013.01); *H04W 36/0083* (2013.01); *H04W 92/20* (2013.01)

(58) Field of Classification Search
CPC .............................. H04W 88/04; H04W 40/00
USPC .................................. 370/315, 401; 455/436
See application file for complete search history.

(56) References Cited

U.S. PATENT DOCUMENTS

| 8,406,192 | B2 * | 3/2013 | Cai et al. ....................... 370/331 |
| 2007/0104148 | A1 | 5/2007 | Kang et al. .................... 370/331 |
| 2008/0125125 | A1 | 5/2008 | Choi et al. .................... 455/436 |
| 2008/0165736 | A1 | 7/2008 | Zhao et al. .................... 370/331 |

(Continued)

FOREIGN PATENT DOCUMENTS

| CN | 101227225 A | 7/2008 |
| EP | 1411678 A1 | 4/2004 |

(Continued)

OTHER PUBLICATIONS

3GPP TR 36.806 V9.0.0 (Mar. 2010), "3$^{rd}$ Generation Partnership Project; Technical specification Group radio Access Network; Evolved Universal Terrestrial Radio Access (E-UTRA); Relay architectures for E-UTRA (LTE-Advanced), (Release 9)", 34 pgs.
R3-100308, 3GPP TSG-RAN WG3 Meeting #66bis, Valencia, Spain, Jan. 18-22, 2010, "Discussion on necessity of X2 interface for relay", CATT, CMCC, 4 pgs.

(Continued)

*Primary Examiner* — Edan Orgad
*Assistant Examiner* — Emmanuel Maglo
(74) *Attorney, Agent, or Firm* — Harrington & Smith

(57) ABSTRACT

There is a method including receiving information from a relay node associated with a first node. The information includes an indication of at least one second node. The method also includes determining parameter information of the at least one second node on the basis of the indication.

19 Claims, 6 Drawing Sheets

(56) References Cited

U.S. PATENT DOCUMENTS

| | | | |
|---|---|---|---|
| 2009/0201884 A1* | 8/2009 | Chaponniere | 370/332 |
| 2010/0309866 A1* | 12/2010 | Katayama et al. | 370/329 |
| 2011/0002304 A1* | 1/2011 | Lee et al. | 370/331 |
| 2011/0007708 A1* | 1/2011 | Hapsari et al. | 370/331 |
| 2011/0080890 A1* | 4/2011 | Cai et al. | 370/331 |
| 2011/0310791 A1* | 12/2011 | Prakash et al. | 370/315 |
| 2012/0039299 A1* | 2/2012 | Teyeb et al. | 370/331 |
| 2012/0320817 A1* | 12/2012 | Xu et al. | 370/315 |
| 2013/0003648 A1* | 1/2013 | Hahn et al. | 370/315 |
| 2013/0040558 A1* | 2/2013 | Kazmi | 455/9 |

FOREIGN PATENT DOCUMENTS

| | | | |
|---|---|---|---|
| JP | 2008172757 A | 7/2008 | |
| JP | 2011522465 A | 7/2011 | |
| JP | 2013530617 A | 7/2013 | |
| JP | 2013534752 A | 9/2013 | |
| WO | WO-2009/139679 A1 | 11/2009 | |

OTHER PUBLICATIONS

R3-101412, 3GPP TSG RAN WG3 #68, Montreal, Canada May 10-14, 2010, "Problems of UE handover in the relaying network", 3 pgs.

R3-101620, 3GPP TSG RAN WG3 Meeting #68, Montreal, Canada, May 10-14, 2010, "Neighbour Discovery and Neighbour Management with Relays", 5 pgs.

R3-101948, 3GPP TSG-RAN WG3 Meeting RAN3 ad Hoc, Beijing, China, Jun. 29-Jul. 1, 2010, "Challenges of X2 deployment for Relay nodes", Nokia Siemens Networks, 4 pgs.

Teyeb, O. et al., "Dynamic Relaying in 3GPP LTE-Advanced Networks", EURASIP Journal on Wireless Communications and Networking, vol. 2009, 11 pgs.

"Part 16: Air Interface for Fixed and Mobile Broadband Wireless Access Systems—Amendment 2: Physical and Medium Access Control Layers for Combined Fixed and Mobile Operation in Licensed Bands and Corrigendum 1", IEEE Std 802.16e-2005, Feb. 28, 2006, 864 pgs.

\* cited by examiner

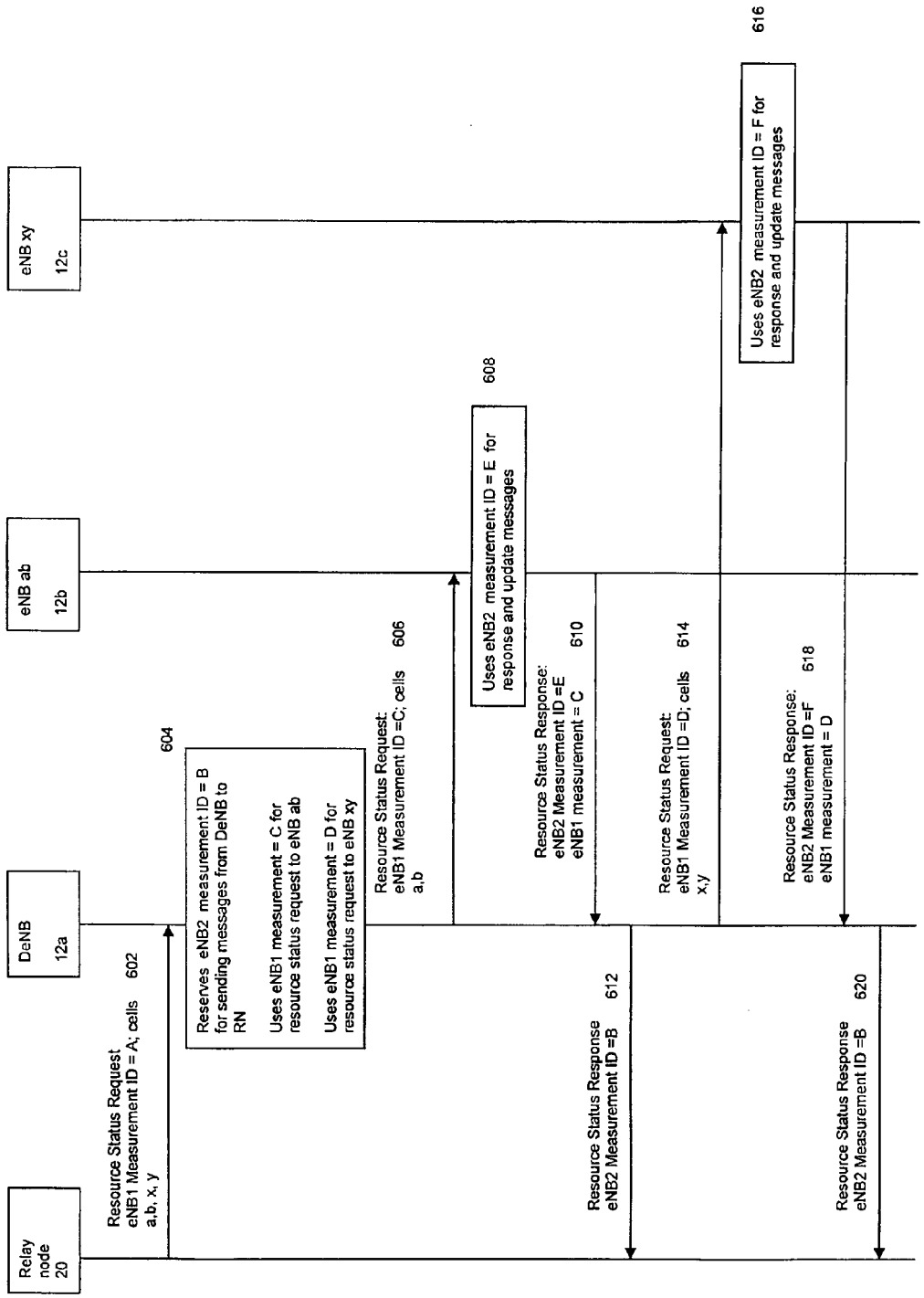

RELAYING COMMUNICATIONS IN ADVANCED LTE SYSTEMS

This disclosure relates to relaying of communications by a mobile device in a communication system.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B.

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

A feature of wireless communication devices is that they offer mobility for the users thereof. A mobile communication device, or mobile device for short, may also be transferred, or handed over, from a base station to another and even between base stations belonging to different systems.

3$^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rates and lower latency with reduced cost. The various development stages of the 3GPP LTE specifications are referred to as releases.

Since the new spectrum bands for international mobile telecommunications (IMT) contain higher frequency bands and LTE-Advanced is aiming at a higher data rate, coverage of one base station may be limited due to the high propagation loss and limited energy per bit. Relaying has been proposed as a possibility to enlarge the coverage. Apart from this goal of coverage extension, introducing relay concepts may also help in the provision of high-bit-rate coverage in a high shadowing environment, reducing average radio-transmission power at the user equipment. This may provide improved battery life, enhanced cell capacity and effective throughput. Relaying may also reduce deployment costs of radio access networks (RAN).

In the LTE-A architecture a relay node may communicate with a base station such as a donor eNodeB (DeNB). The DeNB may act as a proxy for the relay node when the relay node communicates with other entities as discussed in 3GPP TSG RAN WG3 #68 and 3GPP TSG-RAN WG3 #66bis. In this way the DeNB allows correct establishment of interfaces, such as the X2 interface, and ensures non-user equipment signalling is conveyed to and from the relay node appropriately.

A relay node associated with a particular DeNB is considered part of the cell of the DeNB with respect to other entities such as base stations in the system. In practice a relay node associated with a DeNB may share the same eNB identification with the DeNB in order to allow neighbouring relay nodes to identify the relay node and communicate with the DeNB associated with the relay node.

Some interfaces, such as the X2 interfaces were designed as a point to point interface. For example an X2 interface may have been previously used to communicate between two base stations. However with the introduction of relay nodes associated with a base station, for example as used with the LTE-A architecture, the X2 interface may not operate as a point to point interface as originally designed. This can lead to an uncertainty for the type of handover for a user equipment a relay node may initiate. This may also mean that messages cannot be delivered to the correct relay node associated with a particular base station.

Embodiments of the invention aim to address one or several of the above issues.

In accordance with an embodiment there is provided a method comprising:
receiving information from a relay node associated with a first node, the information comprising an indication of at least one second node; and
determining parameter information of the at least one second node on the basis of the indication.

Preferably the information comprises an indication that the at least one second node is a new neighbouring node to the relay node.

Preferably the method comprises sending the parameter information of the at least one second node to the relay node.

Preferably the method comprises determining whether an connection is established between the first node the at least one second node.

Preferably method comprises initiating establishing a connection between the first and the at least one second nodes if no connection is established between the first and the at least one second nodes.

Preferably the method comprises determining whether the relay node is allowed to use the connection between the first and the at least one second nodes.

Preferably the sending the parameter information comprises sending configuration information of the at least one second node to the relay node to indicate that the relay is allowed to use the connection.

Preferably the sending the parameter information comprises excluding sending configuration information of at least one second node to the relay node to indicate that the relay node is not allowed to use the connection.

Preferably the determining comprises determining whether the relay node can use the connection for handover.

Preferably the information comprising an indication of the at least one second node comprises a status request of resources of the second node.

Preferably the determining comprises determining identification information of the relay node and the at least one second node from the status request.

Preferably the method comprises compiling an address mapping between the relay node and the at least one second node on the basis of the identification information.

Preferably the method comprises forwarding messages between the relay node and the at least one second node on the basis of the address mapping.

In accordance with yet another embodiment there is provided an apparatus.
comprising: means for receiving information from a relay node associated with a first node, the information comprising an indication of at least one second node; and means for determining parameter information of the at least one second node on the basis of the indication.

Preferably the information comprises an indication that the at least one second node is a new neighbouring node to the relay node.

Preferably the apparatus comprises means for sending the parameter information of the at least one second node to the relay node.

Preferably the apparatus comprises means for determining whether an connection is established between the first node the at least one second node.

Preferably the apparatus comprises means for initiating establishing a connection between the first and the at least one second nodes if no connection is established between the first and the at least one second nodes.

Preferably the apparatus comprises means for determining whether the relay node is allowed to use the connection between the first and the at least one second nodes.

Preferably the means for sending the parameter information is configured to send configuration information of the at least one second node to the relay node to indicate that the relay is allowed to use the connection.

Preferably the means for sending the parameter information is configured to exclude sending configuration information of at least one second node to the relay node to indicate that the relay node is not allowed to use the connection.

Preferably the means for determining is configured to determine whether the relay node can use the connection for handover.

Preferably the information comprising an indication of the at least one second node comprises a status request of resources of the second node.

Preferably the means for determining is configured to determining identification information of the relay node and the at least one second node from the status request.

Preferably the apparatus comprises means for compiling an address mapping between the relay node and the at least one second node on the basis of the identification information.

Preferably the apparatus comprises means for forwarding messages between the relay node and the at least one second node on the basis of the address mapping.

In accordance with yet another embodiment there is provided an apparatus comprising: a processor; memory including computer program code;
the memory and the computer program code configured to, with the processor, cause the apparatus to perform at least the following: receive information from a relay node associated with a first node, the information comprising an indication of at least one second node; and determine parameter information of the at least one second node on the basis of the indication.

A computer program comprising program code means adapted to perform the method may also be provided.

Various other aspects and further embodiments are also described in the following detailed description and in the attacked claims.

The invention will now be described in further detail, by way of example only, with reference to the following examples and accompanying drawings, in which:

FIG. 6 shows a signaling diagram according to some other embodiments.

Figure 1:
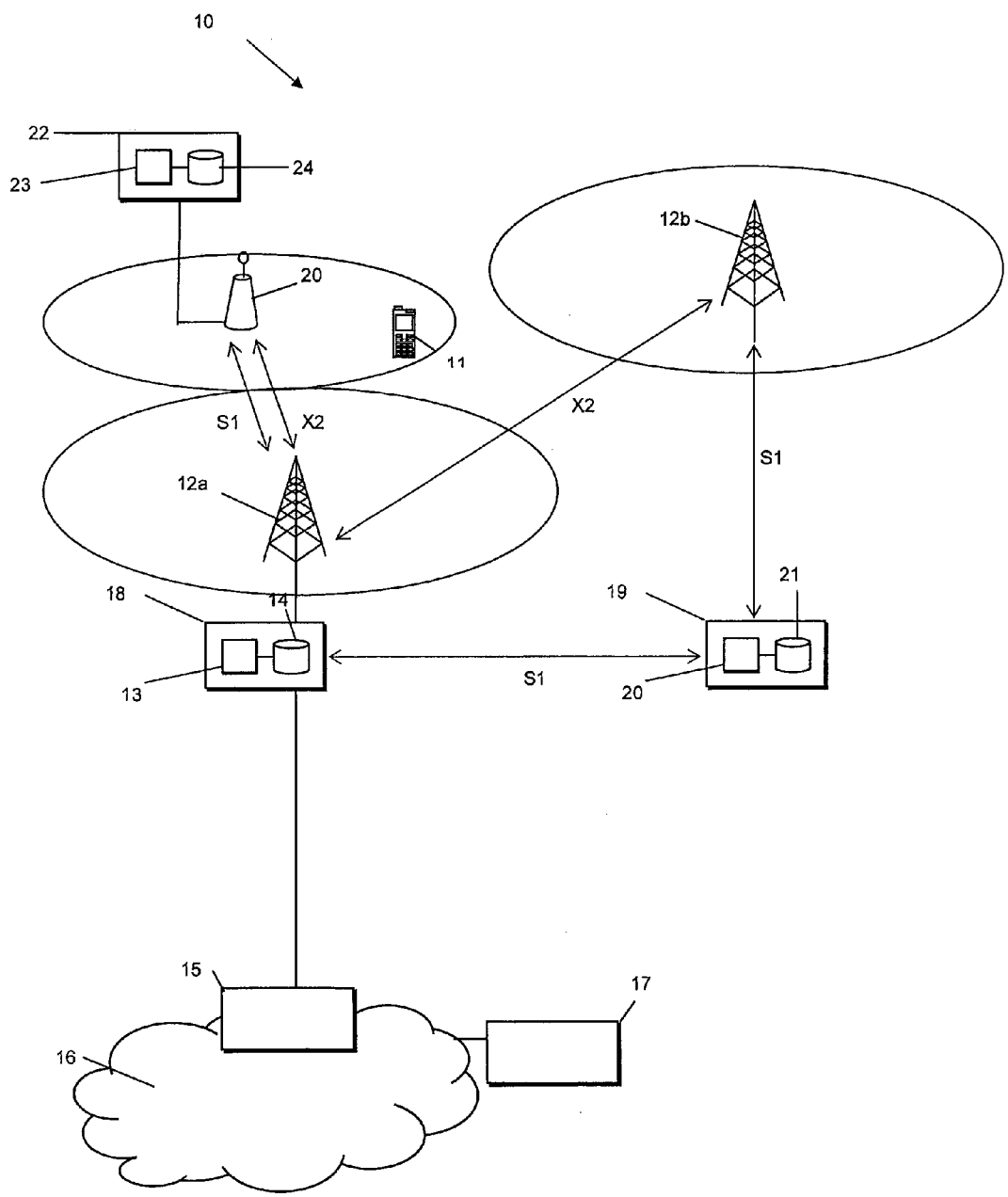
FIG. 1 shows an example of a communication system in some embodiments.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIG. 1 to assist in understanding the technology underlying the described examples.

A communication device can be used for accessing various services and/or applications provided via a communication system. In wireless or mobile communication systems the access is provided via a wireless access interface between mobile communication devices 11 and an appropriate access system 10. A mobile device 11 can typically access wirelessly a communication system via at least one base station or similar wireless transmitter and/or receiver node of the access system 10. One or more base stations may communicate via an X2 interface. The X2 interface may be a direct physical link or may be provided by a data network to which both the base stations are in communication. Base station sites typically provides one or more cells of a cellular system. In the FIG. 1 example a first base station 12a and a second base station 12b are configured to provide a cell, but could provide, for example, three sectors, each sector providing a cell. The mobile device 11 and the first and second base stations 12a, 12b may have one or more radio channels open at the same time and may receive signals from more than one source.

The first and second base stations 12a, 12b are typically controlled by at least one appropriate controller so as to enable operation thereof and management of mobile communication devices in communication with the base station. The control entity can be interconnected with other control entities. In FIG. 1 the controller is shown to be provided by block 18. An appropriate controller apparatus 18 may comprise at least one memory 14, at least one data processing unit 13 and an input/output interface. It shall be understood that the control functions may be distributed between a plurality of controller units. The controller apparatus 13 for the base station 12a, may be configured to execute an appropriate software code to provide the control functions as explained below in more detail. The second base station 12b may also have a controller apparatus, but it is not shown for the purposes of clarity.

In the FIG. 1 example the first base station node 12a is connected to a data network 16 via an appropriate gateway 15. For the purposes of clarity the connection of the second base station with the data network 16 is not shown. A gateway function between the access system and another network such as a packet data network may be provided by means of any appropriate gateway node, for example a packet data gateway and/or an access gateway 17. A communication system may thus be provided by one or more interconnect networks and the elements thereof, and one or more gateway nodes may be provided for interconnecting various networks.

Alternatively a mobile device 11 can typically access the communication system 10 via at least one relay 20. For the purposes of clarity only one relay node 20 associated with a first base station 12a has been shown. In some embodiments there may be other relay nodes associated with the first base station and/or one or more relay nodes associated with other base stations, such as the second base station 12b. The relay node 20 may extend the cell coverage and enhance cell capacity for the communication system.

The relay node 20 may be controlled by at least one controller apparatus 22 to provide operation and management of communication devices 11 in communication with the relay node 20. The controller apparatus 22 is shown in FIG. 1 connected to relay node 20. The controller apparatus 22 may comprise at least one data processor 23 connected to a memory 24. The controller apparatus 22 for the relay node 20 may be configured to execute an appropriate software code to provide the control functions as explained below in more detail.

A communication device 11 can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN). Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like.

A communication device 11 may be used for voice and video calls, for accessing service applications provided via a data network. The communication device 11 may receive signals via appropriate apparatus for receiving and transmitting radio signals on wireless carriers, or radio bearers. The communication device may comprise a transceiver which may be provided for example by means of a radio part and associated antenna arrangement. The antenna arrangement may be arranged internally or externally to the mobile device. A communication device is also typically provided with at least one data processing entity, at least one memory and other possible components for use in tasks it is designed to perform. The data processing, storage and other entities can be provided on an appropriate circuit board and/or in chipsets. Mobility management of the communication device 11 may be carried out by a mobility management entity (MME) 19. For example the MME 19 controls handover of a communication device 11 from one cell to another. The MME 19 may control the handover from a cell of a base station or a relay node to a cell of another base station or relay node. In FIG. 1 the MME 19 communicates with the first base station 12a and the second base station 12b over the S1 interface.

The first and second base stations 12a, 12b are connected by the S1 interface to the EPC (Evolved Packet Core). More specifically the first and second base stations 12a, 12b are connected to the MME 19 by means of the S1-MME connection (not shown) and to the Serving Gateway (S-GW, not shown) by means of the S1-U connection (not shown). In some embodiments the S1 interface supports a many-to-many relation between MMEs/Serving Gateways and eNBs. User Plane traffic is conveyed using the S1-U connection and signaling traffic is conveyed using the S1-MME.

The MME 19 may be controlled by at least one controller apparatus (not shown) to provide operation and mobility management of communication devices 11. The controller apparatus may comprise at least one data processor 20 connected to a memory 21. The controller apparatus for the MME 19 may be configured to execute an appropriate software code to provide the control functions as explained below in more detail. The operation of the relaying information according to some embodiments will now be discussed with reference to FIG. 1. The first base station 12a is a donor eNB (DeNB), according to the LTE-A architecture, for relay node 20. The first base station 12a performs proxy functionalities for the S1 and X2 interfaces of the relay node 20. The non-communication device signalling associated with S1 and X2 procedures are performed either between the relay node 20 and the first base station 12a or between the first base station 12a and the MME 19. The signalling over the S1 and X2 interfaces between the relay node 20 and the first base station 12a are shown as arrows labelled S1 and X2 respectively in FIG. 1. The signalling between the first base station 12a and the MME 19 is shown by the arrow labelled S1. The signalling between the first base station 12a and the second base station 12b is shown over the X2 interface labelled with the arrow X2.

Figure 5:
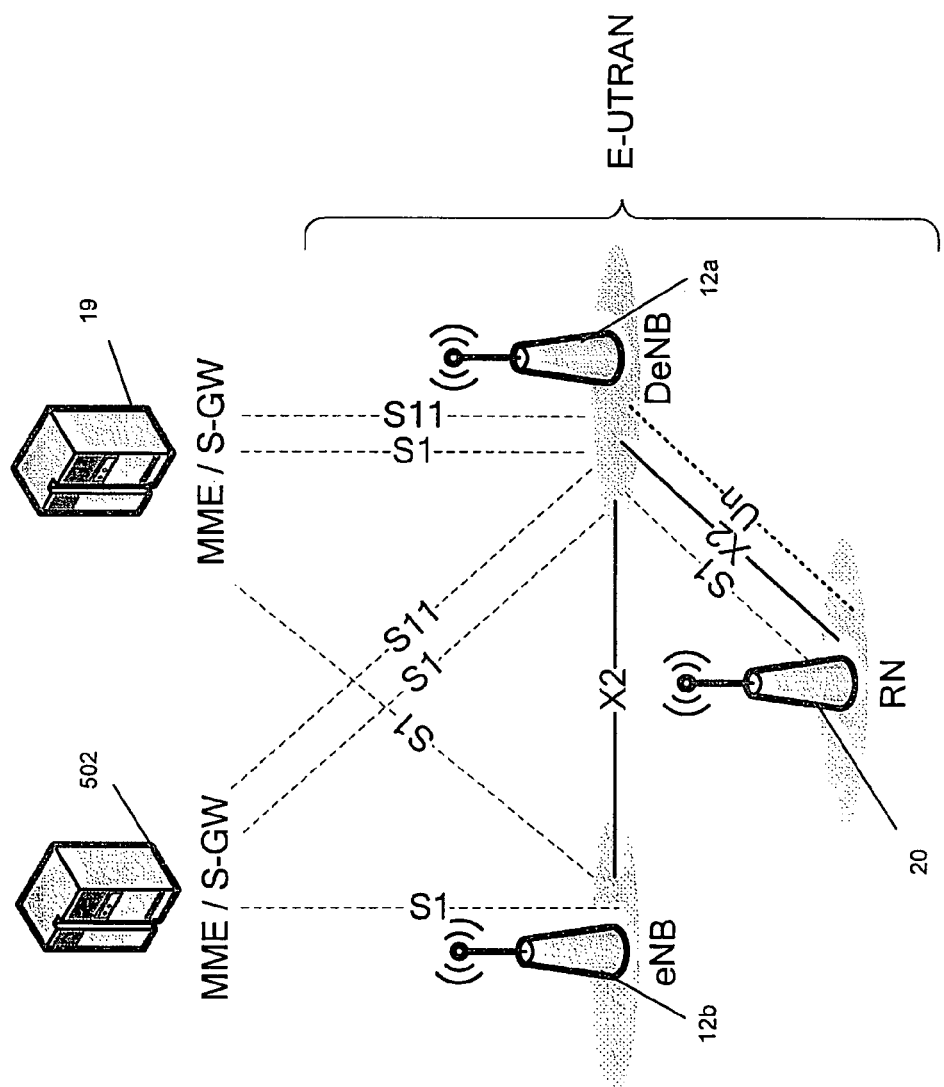
FIG. 5 shows a schematic diagram of the interfaces between neighbouring nodes in some embodiments.

In some embodiments the architecture for supporting the relay nodes 20 is shown in FIG. 5. FIG. 5 shows the first base station 12a, the second base station 12b, the relay node 20, and the MME 19 in a similar arrangement to FIG. 1. In addition in some embodiments there may be one or more other MMEs 502.

The relay node 20 terminates the S1, X2 and Un interfaces from the first base station 12a as shown in FIG. 5. The first base station 12a or DeNB is configured to provide S1 and X2 proxy functionality between the relay node 20 and other network nodes such as the second base station 12b, other eNBs, MMEs and S-GWs. The S1 and X2 proxy functionality may include passing user equipment dedicated S1 and X2 signalling messages as well as general packet radio service tunnelling protocol (GTP) data packets between the S1 and X2 interfaces associated with the relay node 20 and the S1 and X2 interfaces associated with the other network nodes. In some embodiments the first base station 12a is configured to provide a proxy functionality and appears as an MME (for the S1 connection), an eNB (for the X2 connection) and an S-GW to the relay node 20.

The first base station 12a also provides serving gateway (S-GW) and/or proxy gateway (P-GW) functionality for the relay node 20. The first base station 12a is configured to create a session for the relay node 20 and managing evolved packet system (EPS) bearers for the relay node 20, as well as terminating the S11 interface towards the MME 19 serving the relay node 20. The relay node 20 and the first base station 12a also perform mapping of signalling and data packets onto EPS bearers that are setup for the relay node 20. The mapping may be based on quality of service (QoS) mechanisms defined for the user equipment and the proxy gateway.

The first base station 12a performs proxy functionalities to allow correct establishment of X2 interfaces and ensures that signalling over the X2 interface between the relay node 20 and neighbouring nodes of the relay node 20 is conveyed to and from the relay node 20 appropriately.

A neighbouring node of the relay node 20 may be a base station, for example the second base station 12b or another relay node (not shown) for example a relay node associated with the second base station 12b.

In some embodiments relay node 20 is seen as cell of the first base station 12a with respect to a communication device 11. In this way the relay node 20 shares the same unique base station identification as the first base station 12a. The first base station 12a has a unique identification such as an eNB ID. The eNB ID comprises the first 20 bits of a global cell ID (GCI). The relay node 20 in some embodiments will have a global cell ID comprising the first 20 bits equal to all of the other cells supported by the first base station 12a. This means the neighbouring nodes of the relay node 20 are able to identify the relay node 20 and communicate with the appropriate base station e.g. the first base station 12a. When a neighbouring node of the relay node 20 attempts to communicate with the first base station 12a the first base station 12a performs proxy functionalities and forwards the communication towards the relay node 20.

Some embodiments advantageously provide X2 interface communication between the relay node 20 and its neighbouring nodes at a point-to-point level. This means that some embodiments provide an arrangement whereby the relay node 20 obtains information for deciding the type of handover that the relay node 20 needs to initiate when handing over a communication device 11 to a neighbouring node in a neighbouring cell. For example the relay node 20 may obtain information to decide whether to perform an S1 or an X2 based handover. Additionally some embodiments provide an arrangement whereby the relay node 20 and its neighbouring nodes obtained sufficient address information to exchange messages in a point-to-point manner, despite one or more relay nodes being associated with a base station sharing the same X2 interface.

Figure 2:
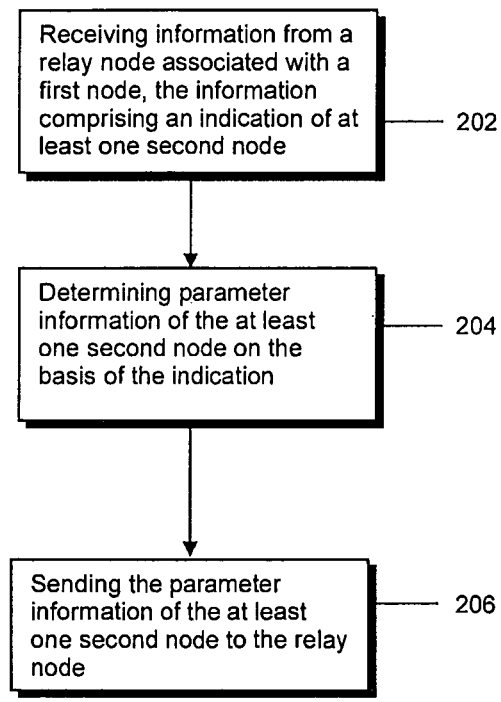
FIG. 2 shows a flow diagram according to some embodiments.

Some embodiments will now be described with reference to FIG. 2. FIG. 2 illustrates a flow-diagram of the method carried out at a base station.

The first base station 12a receives information from a relay node 20a as shown in step 202. The information received from the relay node 20 at the base station 12a comprises an indication of at least one neighbouring node, for example the second base station 12b. The information in some embodiments is sent to the first base station 12a in a message. The message may comprise a request for information with respect to the at least one neighbouring node or alternatively an indication of a request for information with respect to the at least one neighbouring node. In some embodiments the indication of the request may be predetermined. For example, in response to an update message sent from the relay node 20, the first base station determines parameter information of the neighbouring node.

In response to receiving the information from the relay node 20 the first base station 12a determines parameter information of the at least one neighbouring node 12b as shown in step 204. The processor 13 of the base station 12a may initiate an exchange of information with one or more other entities. For example in some embodiments the information received from the relay node indicates that the relay node 20 requires parameter information with respect to one or more interfaces associated with the neighbouring node. The relay node 20 may not be able to obtain interface information from a neighbouring node 12b and therefore needs the first base station 12a to obtain the information regarding the configuration and parameters of an interface associated with the neighbouring node 12b.

The first base station 12a obtains information with respect to the interface of the neighbouring node by sending a request to the neighbouring node. Alternatively, the first base station 12a may retrieve the information of interfaces with neighbouring nodes 12b from memory 14.

Alternatively the processor 13 may determine an address of the at least one neighbouring one node in response to the request received from the relay node 20. In some embodiments the processor 13 may correlate the address from one or more other sources of information with respect to the neighbouring nodes and determine the address information.

Once the processor 13 of the first base station 12a has determined the parameter information of the at least one neighbouring node 12b, the first base station 12a sends the parameter information to the relay node 20. This means the relay node 20 is able to use the X2 interface to receive information by using the first base station as a proxy entity. Advantageously this means that the relay node 20 obtains information about the availability of interfaces with one or more neighbouring nodes. The relay node 20 also is able to send messages to neighbouring nodes on the basis of unique mapping determined by the first base station 12a.

Figure 3:
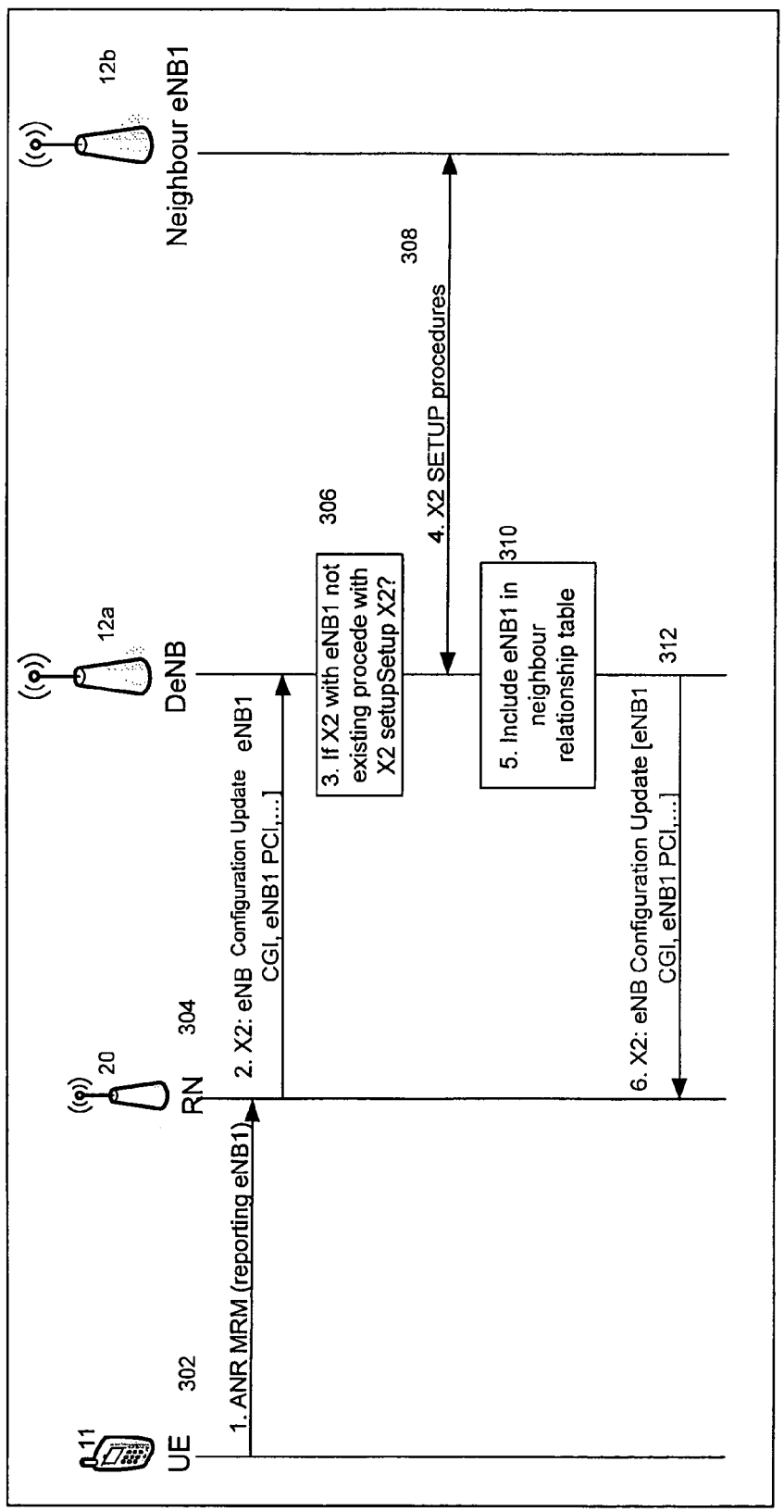
FIG. 3 shows a signaling diagram according to some embodiments.

Some other embodiments will now be described with reference to FIG. 3. FIG. 3 discloses a signalling diagram of some more detailed embodiments.

The relay node 20 may be configured to determine the presence of a new neighbouring node. For example if the second base station 12b performed an initialising procedure, a communication device 11 associated with relay node 20 may perform measurements and detect the new presence of the second base station 12b. The relay node 20 receives a measurement report as shown in step 302. The measurement report or automatic neighbour relation measurements (ANR MRM) is shown in step 302 of FIG. 3.

In some embodiments, measurements can be used by the first base station 12a using an automatic neighbour relation function in order to provide entries in a neighbour relationship table. The neighbour relation function provides information for the processor 13 of the first base station 12a which may comprise information about the identities of neighbouring nodes, whether the relay node 20 is allowed to establish a X2 interface and whether the relay node 20 is allowed to send mobility procedures over the X2 interface.

In some embodiments, on receiving the at least one measurement report from the communication device 11 the processor 23 of the relay node 20 determines the presence of a new neighbouring node. The measurement report may indicate the physical cell identifier. The measurement report may also comprise other information. Alternatively, or additionally there may be subsequent measurement reports received from the user equipment providing other information such as the cell global identity.

The processor 23 may then send a configuration update message to the first base station 12a as shown in step 304. The configuration update message is sent to the first base station 12a, so that the first base station 12a may update records stored in memory 14. Usually, the update message is sent from the relay node 20 to the first base station 12a over an established X2 interface. The update information in some embodiments is an eNB configuration update message. The eNB configuration update message comprises one or more of the following information, the identity of the new neighbouring node, cell global identifier (CGI), and/or physical cell identifier (PCI) The CGI is an identity which uniquely identifies a cell within a public land mobile network. The PCI is another type of cell identity, but is smaller than the CGI. In this way the PCI may be used for information exchange because it requires less of a signalling overhead e.g. the PCI takes up less space in a message. The PCI may however not uniquely identify a cell in the network.

When the first base station 12a receives the update message, the processor 13 of the first base station 12a determines whether there is an appropriate interface established between the first base station and the new neighbouring node 12b. For example, first base station 12a may check whether an interface is established with the new neighbouring node 12b in case communication is required with the new neighbouring node 12b.

In a first scenario the processor 13 of the first base station 12a determines that the interface, e.g. an X2 interface, is already established with the new neighbouring node 12b as shown in step 306. The neighbouring node 12b may be newly detected having been restarted.

The processor 13 of the first base station 12a then determines whether mobility is permitted over the X2 interface.

If the processor 13 of the first base station 12a determines that the X2 interface is available but X2 mobility is not allowed the processor 13 updates its memory 14 to mark the new neighbouring node X2 interface as not allowing handover. In some embodiments the first base station 12a updates a base station neighbouring table for storing the availability and the allowability of mobility on the X2 interfaces of neighbouring nodes. The updating of the first base station 12a memory 14 is shown in step 310.

The processor 13 of the first base station 12a then initiates sending to the relay node 20 information regarding the new neighbouring node as shown in step 312. The update message may be sent at any time to the relay node. Indeed, step 306, 308 and 310 may be carried periodically independent of whether the first base station 12a receives information from the relay node 20. In this way, determining whether an X2 interface is available may be determined prior to receiving a request for availability of the X2 interface with the neighbouring node 12b from the relay node 20.

The processor 23 of the relay node 20 determines information concerning the new neighbouring node from the update message and updates the relay node 20 memory accordingly.

In some embodiments the update message comprises an eNB configuration update message. The eNB configuration update message comprises the details of all the neighbouring nodes of the relay node 20 which allow handover using the X2 interface mobility. Information indicating whether the neighbouring nodes of the relay node are reachable via X2 mobility provides information for the relay node 20 to determine which relay nodes can be used for handing over the communication device 11 via an X2 interface.

In some embodiments if the determination by the first base station 12a is that handover is not allowed for the relay node 20 using the X2 interface, then the configuration update message does not include any details of the newly found neighbouring node. In this way, the absence of information for a neighbouring node indicates information to the relay node 20 that handover via the X2 interface to the new neighbouring node 12b is not allowable.

Alternatively, the X2 interface may have previously been established between the first base station 12a and the neighbouring node 12b and the processor 13 determines that mobility is allowed on the X2 interface. The update message then includes information with respect to the newly found neighbouring node. In this way, the processor 23 of the relay node 20 determines that handover is allowed over an X2 interface to the new neighbouring node 12b with the relay node 20. Indeed the processor 23 determines that the relay node can use the X2 interface on the basis of the presence of information of the neighbouring node in the update message. In another scenario the processor 13 of the first base station 12a determines that an X2 interface has not been established with the new neighbouring node 12b as shown in step 306. For example the neighbouring node 12b may be installed for the first time or the first base station 12a may have been reset. If no X2 interface has been established between the first and second base stations 12a, 12b then the processor 13 of the first base station initiates an X2 set up procedure as shown in step 308. The processor 13 of the first base station 12a may then determine whether X2 mobility for the relay node 20 is allowed on the X2 interface with the neighbouring node 12b. If the X2 mobility is allowed for the relay node 20, then the processor 13 of the first base station 12a sends information to the relay node 20 of the new neighbouring node. The processor 23 of the relay node 20 determines that X2 mobility is available when details of the neighbouring node 12b are included in the update message as shown in step 312.

If the processor 13 of the first base station 12a performs the X2 set up procedure as shown in step 308 with the neighbouring node 12b, the processor 13 may determine that the set up procedure was not successful. For example the processor 13 may determine that the X2 interface with the neighbouring node 12b is not available or the X2 interface with the neighbouring node 12b is available but X2 mobility to the neighbour from the relay node 20 is not possible.

The processor 13 of the first base station 12a, similar to before, will send an update message as shown in step 312 and exclude details of the newly found neighbouring node 12b and include details of all of the other relay node neighbours.

In this way the processor 23 of the relay node 20 determines that the relay node cannot use the X2 interface on the basis of the absence of information of the neighbouring node 12b. In some alternative embodiments, the base station 12a does not send any update message in step 312. In this way, the processor 23 of the relay node in the absence of an eNB configuration update message, will determine that X2 mobility to the newly found neighbouring node 12b is not possible.

The processor 23 of the relay node 20 determines if no details of the new neighbouring node are included in an update message that handover over the X2 interface is not possible. Instead, the processor 23 of the relay node 20 determines that a communication device 11 should be handed over to neighbouring nodes using other means. For example, the relay node may perform handover using the S1 interface.

Figure 4:
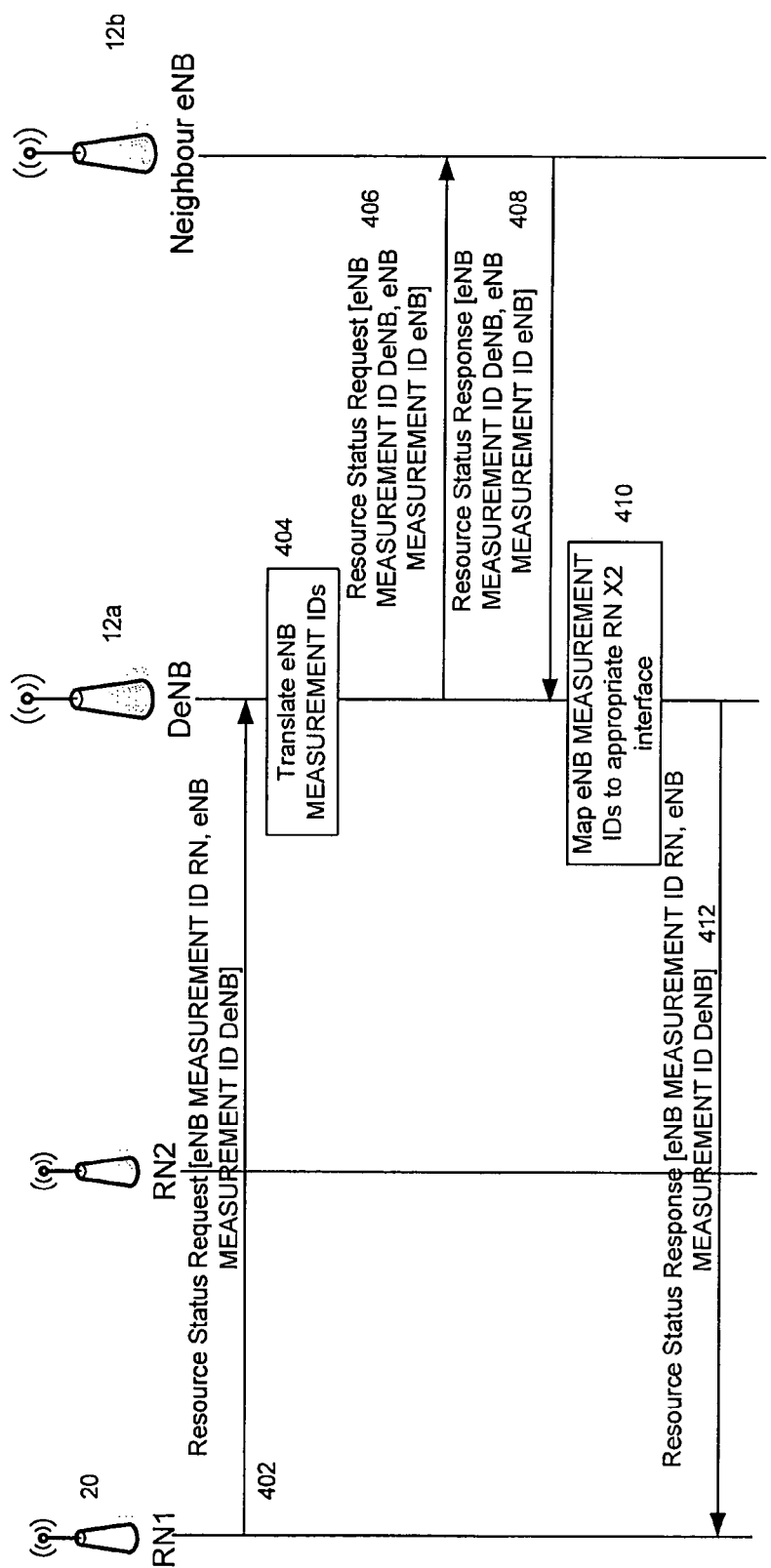
FIG. 4 shows a signaling diagram according to some embodiments.

Another embodiment will now be described in reference to FIG. 4. FIG. 4 discloses a message signalling diagram of some other more detailed embodiments.

The processor 23 of the relay node 20 in some embodiments may initiate a resource status procedure. The resource status procedure is initiated by the processor 23 of the relay node 20 to obtain information from a neighbouring base station 12b, to report specific measurements. In some other embodiments the neighbouring base station 12b may initiate the resource status procedure to obtain specific measurements from the relay node 20.

The resource status procedure messages of the resource status request and response may not include any information elements in the procedure messages to identify the source and target nodes of a network. This is because the resource status procedure messages were originally defined to work on a single hop peer-to-peer interface. Advantageously in some embodiments the first base station 12a is configured to determine identities of relay nodes in the network as follows.

The processor 23 of the relay node 20 initiates the resource status procedure by sending a resource status request as shown in step 402. The resource status request comprises information including an eNB measurement ID of the relay node 20 and an eNB measurement ID of the first base station 12a. The first base station 12a receives the resource status request from the relay node 20 and the processor 13 of the first base station 12a opens the resource status request. The eNB1 Measurement ID is allocated by the first base station 12a so as to uniquely identify the measurement configuration over the X2 interface with the eNB, for example the second base station 12b, that requests the measurement. For example the eNB1 Measurement ID shall be unique with the second base station 12b. This is necessary because the second base station 12b may request several measurements, each of these having a different measurement configuration. In this way, the Measurement ID allows the eNB, e.g. the second base station 12b, to distinguish these measurements.

The processor 13 of the first base station translates the eNB measurement IDs as shown in step 404.

The first base station 12a sends the resource status request to the neighbouring node 12b as shown in step 406. The neighbouring node 12b then sends a resource status response having received the resource status request as shown in step 408. The resource status response comprises information of the current available resources of the neighbouring node 12b for the relay node 20.

The processor 13 of the first base station 12a on receiving the resource status response from the neighbouring node 12b maps the eNB measurement IDs to the appropriate relay node on the X2 interface. The mapping is shown in step 410. The first base station 12a ensures that there is a unique mapping between the eNB measurement ID exchanged on the different parts of the X2 communication. For example the first base station 12a determines unique mapping for the X2 communication from the relay node 20 to the first base station 12a and unique mapping from the first base station 12a to the neighbouring node 12b.

After the processor 13 has mapped the eNB measurement ID the processor sends the resource status response to the relay node 20 as shown in step 410.

The mapping and translation of the measurement identifications will now be discussed in further detail with reference to FIG. 6. FIG. 6 shows a signaling diagram according to some embodiments.

The processor 13 of the first base station 12a receives the resource status request from the relay node 20 as shown in step 602. The resource status request comprises a measurement ID=A, where A denotes an identification relay node 20. The resource status request also comprises measurements of cells a, b, x and y. Cells a and b are cells of the second base station 12b and cells x and y are cells of a third base station 12c. On receiving the resource status request, the processor 13 of the first base station 12a reserves an identification eNB2 measurement ID=B for communication between the first base station 12a and the relay node 20 for resource status response messages and resource status update messages as shown in step 604.

The processor 13 determines from the resource status request that the resource status request must be forwarded to the second base station 12b to obtain resource status information for cells a and b. Similarly, the processor 13 determines from the resource status request that the resource status request must be forwarded to the third base station 12c to obtain the resource status information for cells x and y.

The processor 13 then uses an identification, eNB1 measurement ID=C for sending the request to the second base station 12b and an identification, eNB1 measurement ID=D for sending the request to the third base station 12c also shown in step 604. The first base station 12a then sends the requests to the second base station 12b and the third base station 12c as shown in steps 6060 and 614 respectively.

The second base station 12b receives the resource status request and decides the use an identification eNB2 measurement ID=E for a resource status response and resource status update messages as shown in step 608. Similarly, the third base station 12c receives the resource status request and decides the use an identification eNB2 measurement ID=F for a resource status response and resource status update messages as shown in step 616.

The second base station 12b and the third base station 12c then send resource status response messages or resource status update messages to the first base station 12a as shown in steps 610 and 618 respectively.

In some embodiments, the resource status response and the resource status update messages contain both the identifications which are allocated by the first base station 12a and the second or third base stations 12b, 12c. For example, the resource status response message comprises eNB1 measurement ID which was allocated by the first base station 12a and eNB2 measurement ID which was allocated by the second or third base station 12b, 12c. FIG. 6 illustrates the resource status response comprising two identifications in steps 610 and 618.

The processor 13 of the first base station having received the resource status messages from the second or third base stations 12b, 12c, then determines the identification which should be used to send the messages to the relay node 20.

The first base station 12a then sends the resource status response messages or the resource status update messages received from the second or third base stations 12b, 12c to the relay node 20 as shown in steps 612 or 620 respectively.

The presence of the eNB1 measurement ID in the resource status response message, which was allocated by the first base station 12a in step 604, allows the first base station 12a to identify the corresponding resource status request message. In this way the processor 13 of the first base station 12a can determine that the request message comprising eNB1 measurement ID=C corresponds to the response message comprising eNB2 measurement ID=E; the request message comprising eNB1 measurement ID=D corresponds to the response message comprising eNB2 measurement ID=F; and the request message comprising eNB1 measurement ID=A corresponds to the response message comprising eNB2 measurement ID=B.

In this way, the processor 13 of the first base station performs message mapping from the relay node 20 to the second or third base stations 12b, 12c by mapping the identification from the relay node eNB1 measurement ID=A to the identifications of the second and third base stations eNB1 measurement ID=C, D. Similarly, the processor 13 performs message mapping from the second to the relay node by mapping the identifications of the second and third base stations eNB2 measurement ID=E, F to the identification for the relay node eNB2 measurement ID=B.

In some embodiments, the relay node 20 receives a single resource status update message from the first base station 12a instead of two resource status update messages shown in steps 612 and 620. The first base station 12a may wait until all resource status responses have been received from the second and third base stations as shown in steps 610 and 618. The processor 13 of the first base station is configured to combine the information from the resource status response messages into a single resource status response message. The first base station 12a then sends the single resource status response message from the first bases station 12a to the relay node 20. In this way resource status response messages shown in steps 612 and 620 are replaced with a single resource status response message.

It is noted that whilst embodiments have been described in relation to LTE, similar principles can be applied to any other communication system where a carrier comprising a multiple of component carriers is employed. For example, some or all of the previous embodiment may be applied to universal mobile telephone system, UMTS.

Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more embodiments with any of the other embodiments previously discussed.

The invention claimed is:

1. A method comprising:
receiving, at a first base station, information from a relay node associated with the first base station, the information comprising an indication of at least one second base station neighboring the first base station;
determining, at the first base station, X2 interface configuration parameter information of the at least one second base station on the basis of the indication, wherein the determined X2 interface configuration parameter information comprises availability of an X2 interface between the first base station and the at least one second base station, and comprises configuration and parameters of the X2 interface between the first base station and the at least one second base station;

determining whether the X2 interface is established between the first base station and the at least one second base station;

determining whether the relay node is allowed to use the X2 interface between the first and the at least one second base station, comprising determining whether the relay node can use the X2 interface for handover and setting the X2 interface configuration parameter information to include details of the at least one second base station; and sending, by the first base station, the determined X2 interface configuration parameter information toward the relay node, wherein sending the details of the at least one second base station indicates to the relay node that the X2 interface between the first and the at least one second base station can be used for mobility.

2. A method according to claim 1 wherein the information comprises an indication that the at least one second base station is a new neighbouring node to the relay node.

3. A method according to claim 1, wherein the method comprises establishing the X2 interface between the first and the at least one second base station if no X2 interface is established between the first and the at least one second base station.

4. A method according to claim 1, wherein the sending the determined X2 interface configuration parameter information comprises sending configuration and parameters of the X2 interface between the first base station and the at least one second base station to the relay node to indicate that the relay node is allowed to use the X2 interface.

5. A method according to claim 1, wherein the sending the determined X2 interface configuration parameter information comprises excluding sending configuration and parameters of the X2 interface between the first base station and a selected one of the at least one second base station to the relay node to indicate that the relay node is not allowed to use the X2 interface between the first base station and the selected second base station.

6. A method according to claim 1 wherein the information comprising an indication of the at least one second base station comprises a status request of resources of the second base station.

7. A method according to claim 6 wherein the determining comprises determining identification information of the relay node and the at least one second base station from the status request.

8. A method according to claim 7 wherein the method comprises compiling an address mapping between the relay node and the at least one second base station on the basis of the identification information.

9. A method according to claim 8 wherein the method comprises forwarding messages between the relay node and the at least one second base station on the basis of the address mapping.

10. A computer program product comprising code stored in a non-transitory computer-readable medium, wherein when the code is executed on a processor, the processor is configured to execute the following:

receiving, at a first base station, information from a relay node associated with the first base station, the information comprising an indication of at least one second base station neighboring the first base station;

determining, at the first base station, X2 interface configuration parameter information of the at least one second base station on the basis of the indication, wherein the determined X2 interface configuration parameter information comprises availability of an X2 interface between the first base station and the at least one second base station, and comprises configuration and parameters of the X2 interface between the first base station and the at least one second base station;

determining whether the X2 interface is established between the first base station and the at least one second base station;

determining whether the relay node is allowed to use the X2 interface between the first and the at least one second base station, comprising determining whether the relay node can use the X2 interface for handover and setting the X2 interface configuration parameter information to include details of the at least one second base station; and sending, by the first base station, the determined X2 interface configuration parameter information toward the relay node, wherein sending the details of the at least one second base station indicates to the relay node that the X2 interface between the first and the at least one second base station can be used for mobility.

11. An apparatus comprising at least one processor and at least one memory including computer program code, the at least one memory and the computer program code being configured, with the at least one processor, to cause the apparatus to perform at least the following:

receiving, at a first base station, information from a relay node associated with the first base station, the information comprising an indication of at least one second base station;

determining, at the first base station, X2 interface configuration parameter information of the at least one second base station on the basis of the indication, wherein the determined X2 interface configuration parameter information comprises availability of an X2 interface between the first base station and the at least one second base station, and comprises configuration and parameters of the X2 interface between the first base station and the at least one second base station;

determining whether the X2 interface is established between the first base station and the at least one second base station;

determining whether the relay node is allowed to use the X2 interface between the first and the at least one second base station, comprising determining whether the relay node can use the X2 interface for handover and setting the X2 interface configuration parameter information to include details of the at least one second base station; and sending, by the first base station, the determined X2 interface configuration parameter information toward the relay node, wherein sending the details of the at least one second base station indicates to the relay node that the X2 interface between the first and the at least one second base station can be used for mobility.

12. An apparatus according to claim 11 wherein the information comprises an indication that the at least one second base station is a new neighbouring node to the relay node.

13. An apparatus according to claim 11, wherein the at least one memory and the computer program code are further configured, with the at least one processor, to cause the apparatus to perform at least the following: establishing the X2 interface between the first and the at least one second base station if no X2 interface is established between the first and the at least one second base station.

14. An apparatus according to claim 11, wherein the at least one memory and the computer program code are further configured, with the at least one processor, to cause the apparatus to perform at least the following: sending the X2 interface configuration parameter information by sending configuration and parameters of the X2 interface between the first base station and the at least one second base station to the relay node to indicate that the relay node is allowed to use the X2 interface.

15. An apparatus according to claim 11, wherein sending further comprises sending the X2 interface configuration parameter information by excluding sending configuration and parameters of the X2 interface between the first base station and a selected one of at least one second base station to the relay node to indicate that the relay node is not allowed to use the X2 interface between the first base station and the selected second base station.

16. An apparatus according to claim 11 wherein the information comprising an indication of the at least one second base station comprises a status request of resources of the second base station.

17. An apparatus according to claim 16 wherein the at least one memory and the computer program code are further configured, with the at least one processor, to cause the apparatus to perform at least the following: determining identification information of the relay node and the at least one second base station from the status request.

18. An apparatus according to claim 17 wherein the at least one memory and the computer program code are further configured, with the at least one processor, to cause the apparatus to perform at least the following: compiling an address mapping between the relay node and the at least one second base station on the basis of the identification information.

19. An apparatus according to claim 18 wherein the at least one memory and the computer program code are further configured, with the at least one processor, to cause the apparatus to perform at least the following: forwarding messages between the relay node and the at least one second base station on the basis of the address mapping.

* * * * *